United States Patent [19]

Tang et al.

[11] Patent Number: 5,409,783

[45] Date of Patent: Apr. 25, 1995

[54] RED-EMITTING ORGANIC ELECTROLUMINESCENT DEVICE

[75] Inventors: Ching W. Tang, Rochester; Charles H. Weidner, Ontario; Dustin L. Comfort, Rochester, all of N.Y.

[73] Assignee: Eastman Kodak Company, Rochester, N.Y.

[21] Appl. No.: 201,292

[22] Filed: Feb. 24, 1994

[51] Int. Cl.⁶ .......................................... H05B 33/14
[52] U.S. Cl. .................................. 428/690; 428/691; 428/917; 313/501; 313/504; 313/506
[58] Field of Search ..................... 428/690, 691, 917; 313/501, 504, 506

[56] References Cited

U.S. PATENT DOCUMENTS

| | | | |
|---|---|---|---|
| 2,733,367 | 1/1956 | Gillson | 313/108 |
| 2,941,104 | 6/1960 | Evans | 313/108 |
| 3,172,862 | 3/1965 | Gurnee et al. | 252/301.33 |
| 3,173,050 | 3/1965 | Gurnee | 313/108 |
| 3,180,730 | 4/1965 | Klupfel et al. | 96/1 |
| 3,359,445 | 12/1967 | Roth | 313/108 |
| 3,530,325 | 9/1970 | Mehl et al. | 313/108 |
| 3,567,450 | 3/1971 | Brantly et al. | 96/1.5 |
| 3,621,321 | 11/1971 | Williams et al. | 313/108 |
| 3,658,520 | 4/1972 | Brantly et al. | 96/1.6 |
| 3,710,167 | 1/1973 | Dresner et al. | 313/108 |
| 3,772,556 | 11/1973 | Williams | 313/108 |
| 3,935,031 | 1/1976 | Adler | 136/206 |
| 3,995,299 | 11/1976 | Partridge et al. | 357/8 |
| 4,035,686 | 7/1977 | Fleming | 313/503 |
| 4,175,960 | 11/1979 | Berwick et al. | 430/58 |
| 4,356,429 | 10/1982 | Tang | 313/503 |
| 4,539,507 | 9/1985 | VanSlyke et al. | 313/504 |
| 4,695,717 | 9/1987 | Hirai et al. | 250/213 R |
| 4,720,432 | 1/1988 | VanSlyke et al. | 428/457 |
| 4,725,513 | 2/1988 | Eguchi et al. | 428/690 |
| 4,741,976 | 5/1988 | Eguchi et al. | 428/690 |
| 4,769,292 | 9/1988 | Tang et al. | 428/690 |
| 4,775,820 | 10/1988 | Eguchi et al. | 313/504 |
| 4,950,950 | 8/1990 | Perry et al. | 313/504 |
| 5,126,214 | 6/1992 | Tokailin et al. | 428/690 |
| 5,283,132 | 3/1992 | Ogure et al. | 428/690 |
| 5,059,862 | 10/1991 | VanSlyke et al. | 313/503 |

OTHER PUBLICATIONS

Physics of Semiconductor Devices, S. M. Sze, John Wiley & Sons, New York 1969.
Organic Semiconductors, Gutmann et al, John Wiley & Sons, New York 1967.
Photographic Sensitivity, R. J. Cox, Academic Press, New York 1973.
Electroluminescence of Green Light Region in Doped Anthracene, Kawabe et al, Japan J. Appl. Phys. 10 (1971) 527-528.
Double Injection Electroluminescence in Anthracene, J. Dresner, RCA Review vol. 30, pp. 332-334.

*Primary Examiner*—Charles R. Nold
*Attorney, Agent, or Firm*—Raymond L. Owens

[57] ABSTRACT

Disclosed is a red-emitting organic electroluminescent device comprising in sequence an anode, an organic hole injecting and transporting zone, a doped luminescent zone, an electron transport zone and a cathode, characterized in that said doped luminescent zone is comprised of a fluorescent phthalocyanine compound capable of emitting a wavelength in the range of 660 to 780 nm.

12 Claims, 2 Drawing Sheets

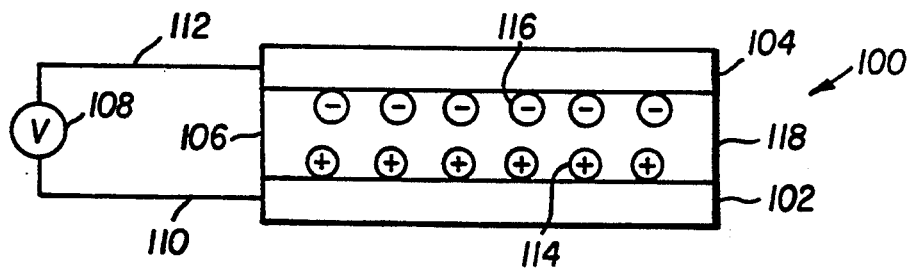
FIG. 1
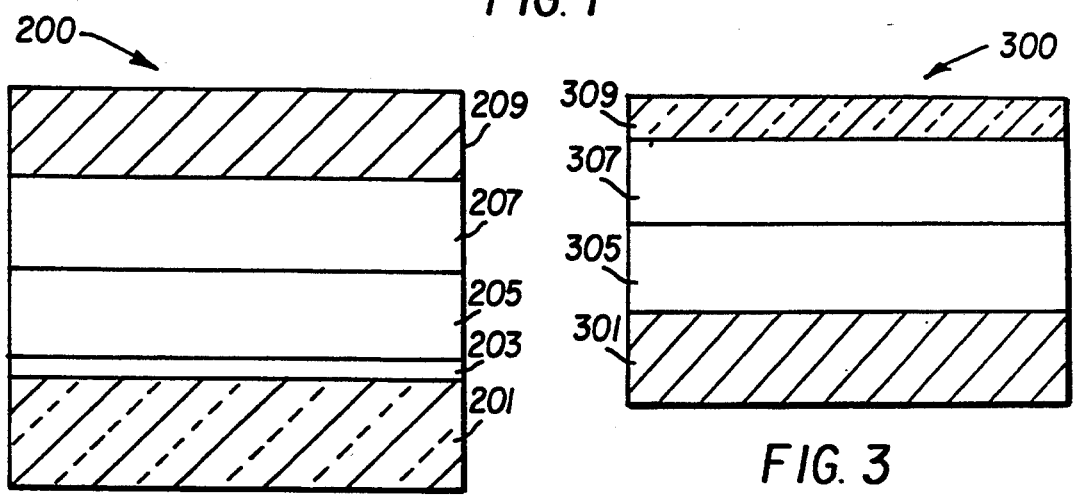
FIG. 2
FIG. 3
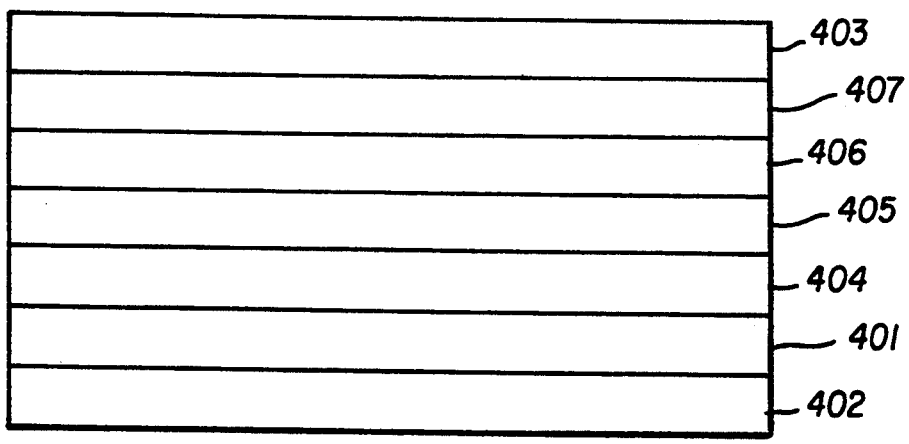
FIG. 4

RED-EMITTING ORGANIC ELECTROLUMINESCENT DEVICE

FIELD OF THE INVENTION

This invention relates to organic electroluminescent (EL) devices and more particularly, this invention relates to electroluminescent devices that have a red-emitting layer or zone positioned between anode and cathode electrodes.

BACKGROUND OF THE INVENTION

While organic electroluminescent devices have been known for about two decades, their performance limitations have represented a barrier to many desirable applications. Further, such devices have been developed primarily for visual display applications. Thus, the organic fluorescent materials chosen are intended to give a satisfactory color in the visible spectrum, normally with emission maxima at about 460, 550 and 630 nm for blue, green and red.

Gurnee et al U.S. Pat. No. 3,172,862, issued Mar. 9, 1965, disclosed an organic electroluminescent device. The EL device was formed of an emitting layer positioned in conductive contact with a transparent electrode and a metal electrode. The emitting layer was formed of a conjugated organic host material, a conjugated organic activating agent having condensed benzene rings, and a finely divided conductive material. Naphthalene, anthracene, phenanthrene, pyrene, benzopyrene, chrysene, picene, carbazole, fluorene, biphenyl, terphenyls, quaterphenyls, triphenylene oxide, dihalobiphenyl, trans-stilbene, and 1,4-diphenylbutadiene were offered as examples of organic host materials. Anthracene, tetracene, and pentacene were named as examples of activating agents, with anthracene being disclosed to impart a green hue and pentacene to impart a red hue. Chrome and brass were disclosed as examples of the metal electrode while the transparent electrode was disclosed to be a conductive glass. The emitting layer was disclosed to be "as thin as possible, about 0.0001 inch", i.e., 2.54 micrometers. Electroluminescence was reported at 800 volts and 2000 hertz.

Recognizing the disadvantage of employing high voltages and frequencies, Gurnee U.S. Pat. No. 3,173,050 reported electroluminescence at 110 volts DC by employing in series with the emitting layer an impedance layer capable of accounting for 5 to 50% of the voltage drop across the electrodes.

Until relatively recently, the art has reported at best modest performance improvements over Gurnee while resorting to increasingly challenging device constructions, such as those requiring alkali metal cathodes, inert atmospheres, relatively thick monocrystalline anthracene phosphor elements, and/or specialized device geometries. Mehl U.S. Pat. No. 3,382,394, Mehl et al U.S. Pat. No. 3,530,325, Roth U.S. Pat. No. 3,359,445, Williams et al U.S. Pat. No. 3,621,321, Williams U.S. Pat. No. 3,772,556, Kawabe et al "Electroluminescence of Green Light Region in Doped Anthracene", *Japan Journal of Applied Physics*, Vol. 10, pp. 527–528, 1971, and Partridge U.S. Pat. No. 3,995,299 are representative.

In 1969, Dresner, "Double Injection Electroluminescence in Anthracene", *RCA Review*, Vol. 30, pp. 332–334, independently corroborated the performance levels of then state of the art EL devices employing thick anthracene phosphor elements, alkali metal cathodes, and inert atmospheres to protect the alkali metal from spontaneous oxidation. These EL devices were more than 30 µm in thickness and required operating potentials of more than 300 volts. In attempting to reduce phosphor layer thickness and thereby achieve operation with potential levels below 50 volts, Dresner attempted to coat anthracene powder between a conductive glass anode and a gold, platinum or tellurium grid cathode, but phosphor layer thicknesses of less than 10 µm could not be successfully achieved because of pinholes.

Dresner U.S. Pat. No. 3,710,167 reported a more promising EL device employing like Gurnee et al and Gurnee a conjugated organic compound, but as the sole component of an emitting layer of less than 10 µm (preferably 1 to 5 µm) in thickness. A tunnel injection cathode consisting of aluminum or degenerate N+ silicon with a layer of the corresponding aluminum or silicon oxide of less than 10 Angstroms in thickness was employed.

The most recent discoveries in the organic EL device construction have resulted from EL device constructions with two extremely thin layers (<1.0 µm in combined thickness) separating the anode and cathode, one specifically chosen to transport holes and the other specifically chosen to transport electrons and acting as the organic luminescent zone of the device. This has allowed applied voltages to be reduced for the first time into ranges approaching compatibility with integrated circuit drivers, such as field effect transistors. At the same time, light outputs at these low driving voltages have been sufficient to permit observation under common ambient lighting conditions.

For example, Tang U.S. Pat. No. 4,356,429 discloses in Example 1 an EL device formed of a conductive glass transparent anode, a 1000 Angstroms hole transporting layer of copper phthalocyanine, a 1000 Angstroms electron transporting layer of copper phthalocyanine, a 1000 Angstroms electron transporting layer of tetraphenylbutadiene in poly(styrene) also acting as the luminescent zone of the device, and a silver cathode. The EL device emitted blue light when biased at 20 volts at an average current density in the range of 30 to 40 mA/cm$^2$. The brightness of the device was 5 cd/m$^2$. Tang teaches useful cathodes to be those formed from common metals with a low work function, such as indium, silver, tin and aluminum.

A further improvement in organic layer EL devices is taught by Van Slyke et al U.S. Pat. No. 4,539,507. Referring to Example 1, onto a transparent conductive glass anode were vacuum vapor deposited successive 750 Angstrom hole transporting 1,1-bis(4-di-p-tolylaminophenyl) cyclohexane and electron transporting 4,4'-bis(5,7-di-t-pentyl-2-benzoxzolyl)stilbene layers, the latter also providing the luminescent zone of the device. Indium was employed at the cathode. The EL device emitted blue-green light (520 nm peak). The maximum brightness achieved 340 cd/m$^2$ at a current density of about 140 mA/cm$^2$ when the applied voltage was 22 volts. The maximum power conservation efficiency was about $1.4 \times 10^{-3}$ watt/watt, and the maximum EL quantum efficiency was about $1.2 \times 10^{-2}$ photon/electron when driven at 20 volts. Silver, tin, lead, magnesium, manganese and aluminum are specifically mentioned for cathode construction.

Van Slyke et al U.S. Pat. No. 4,720,432 discloses an organic EL device comprised of, in the sequence recited, an anode, an organic hole injecting and transporting zone, and a cathode. The organic EL device is further characterized in that the organic hole injecting and transporting zone is comprised of a layer in contact with the anode containing a hole injecting porphyrinic compound and a layer containing a hole transporting aromatic tertiary amine interposed between the hole injecting layer and the electron injecting and transporting zone.

Tang et al U.S. Pat. No. 5,059,862 discloses an EL device comprised of a cathode formed of a plurality of metals other than alkali metals, at least one of which has a work function of less than $4e^V$.

Tang et al U.S. Pat. No. 4,769,292 discloses an electroluminescent device having a luminescent zone of less than one $\mu m$ in thickness comprised of an organic host material capable of sustaining hole-electron recombination and a fluorescent dye material capable of emitting light in response to energy released by hole-electron recombination.

Perry et al U.S. Pat. No. 4,950,950 discloses an electroluminescent device having a luminescent zone comprised of an organic host material capable of sustaining hole-electron recombination. The hole-transporting agent is a silazane.

Eguchi et al U.S. Pat. No. 4,775,820 discloses a multi-layer electroluminescent device having a layer of an electron-acceptable organic compound, a layer of an electron donating organic compound and a layer having insulating properties. Compounds disclosed having EL function are: fused polycyclic aromatic hydrocarbons, p-terphenyl, 2,5-diphenyloxazole, 1,4-bis(2-methylstyrl)-benzene, xanthine, coumarin, acridine, cyanine dye, benzophenon, phtalocyanine and metal complexes thereof, porphyrin and metal complexes thereof, 8-hydroxyquinoline and metal complexes thereof, ruthenium complexes, rare earth complexes and derivatives of the above-mentioned compounds.

Eguchi et al U.S. Pat. No. 4,741,976 discloses an electroluminescent device having two luminescent layers provided between a pair of electrodes and an electrode provided between the two luminescent layers. Compounds having EL function include those noted for U.S. Pat. No. 4,775,820.

Eguchi et al U.S. Pat. No. 4,741,976 discloses an EL device comprising a luminescent layer having EL function with an intervening insulating layer sandwiched between a pair of electrodes. Compounds having EL function include those described in U.S. Pat. No. 4,775,820.

Eguchi et al U.S. Pat. No. 4,725,513 discloses an electroluminescent device having a luminescent layer which comprises a mixed Langmuir-Blodgett monomolecular film.

Hirai et al U.S. Pat. No. 4,695,717 discloses a display device comprising a laminated structure of a photoconductive layer wherein the photoconductive layer can be formed from phthalocyanine dye as well as other compounds.

SUMMARY OF THE INVENTION

It is an object of the invention to provide an improved EL device.

It is another object of the invention to provide an improved EL device capable of emitting in the red or deep-red region of the spectrum.

These and other objects will be apparent from the accompanying drawings and description of the process.

In accordance with these objects, there is provided a red-emitting organic electroluminescent device comprising in sequence an anode, an organic hole injecting and transporting zone, a doped luminescent zone, an electron transport zone and a cathode, characterized in that said doped luminescent zone is comprised of a fluorescent phthalocyanine compound capable of emitting a wavelength in the range of 660 to 780 nm.

BRIEF DESCRIPTION OF THE DRAWINGS

These and other advantages of the present invention can be better appreciated by reference to the following detailed description considered in conjunction with the drawings, in which:

FIGS. 1, 2, 3 and 4 are schematic diagrams of EL devices.

Figure 5:
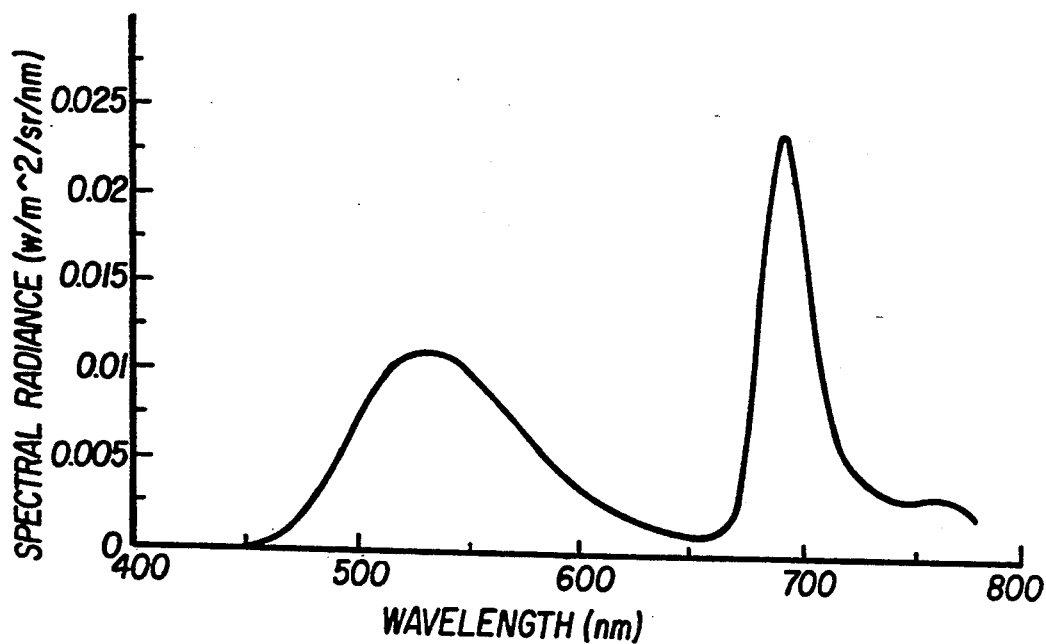
FIG. 5 is a plot of spectral radiance versus wavelength for the EL device of Example 1.

The drawings are necessarily of a schematic nature, since the thicknesses of the individual layers are too thin and thickness differences of the various device elements too great to permit depiction to scale or to permit proportionate scaling.

DESCRIPTION OF THE PREFERRED EMBODIMENTS

An electroluminescent or EL device 100 according to the invention is schematically illustrated in FIG. 1. Anode 102 is separated from cathode 104 by an organic luminescent medium 106. The anode and the cathode are connected to an external power source 108 by conductors 110 and 112, respectively. The power source can be a continuous direct current or alternating current voltage source or an intermittent current voltage source. Any convenient conventional power source, including any desired switching circuitry, can be employed which is capable of positively biasing the anode with respect to the cathode. Either the anode or cathode can be at ground potential.

The EL device can be viewed as a diode which is forward biased when the anode is at a higher potential than the cathode. Under these conditions, the anode injects holes (positive charge carriers), schematically shown at 114, into the luminescent medium while the cathode injects electrons, schematically shown at 116, into the luminescent medium. The portion of the luminescent medium adjacent the anode thus forms a hole injecting and transporting zone while the portion of the luminescent medium adjacent the cathode forms an electron injecting and transporting zone. The injected holes and electrons each migrate toward the oppositely charged electrode. This results in hole-electron recombination within the organic luminescent medium. Then a migrating electron drops from its conduction potential to a valence band in filling a hole, energy is released as light. Hence, the organic luminescent medium forms between the electrodes a luminescence zone receiving mobile charge carriers from each electrode. Depending upon the choice of alternative constructions, the released light can be emitted from the luminescent material through one or more of edges 118 separating the electrodes, through the anode, through the cathode, or through any combination of the foregoing.

Reverse biasing of the electrodes reverses the direction of mobile charge migration, interrupts charge injection, and terminates light emission. The most common mode of operating organic EL devices is to employ a forward biasing DC power source and to rely on external current interruption or modulation to regulate light emission.

In the organic EL devices of the invention, it is possible to maintain a current density compatible with efficient light emission while employing a relatively low voltage across the electrodes by limiting the total thickness of the organic luminescent medium to less than 1 μm (10,000 Angstroms). At a thickness of less than 1 μm, an applied voltage of 20 volts results in a field potential of greater than $2 \times 10^5$ volts/cm, which is compatible with efficient light emission. As more specifically noted below, preferred thicknesses of the organic luminescent medium are in the range of from 0.1 to 0.5 μm (1,000 to 5,000 Angstroms), allowing further reductions in applied voltage and/or increase in the field potential, are well within device construction capabilities.

Since the organic luminescent medium is quite thin, it is usually preferred to emit light through one of the two electrodes. This is achieved by forming the electrode as a translucent or transparent coating, either on the organic luminescent medium or on a separate translucent or transparent support. The thickness of the coating is determined by balancing light transmission (or extinction) and electrical conductance (or resistance). A practical balance in forming a light transmissive metallic electrode is typically for the conductive coating to be in the thickness range of from about 50 to 250 Angstroms. Where the electrode is not intended to transmit light, any greater thickness found convenient in fabrication can also be employed.

Organic EL device 200 shown in FIG. 2 is illustrative of one preferred embodiment of the invention. Because of the historical development of organic EL devices, it is customary to employ a transparent anode. This has been achieved by providing a transparent insulative support 201 onto which is deposited a conductive relatively high work function metal or metal oxide transparent layer to form anode 203. Since the portion of the organic luminescent medium immediately adjacent the anode acts as a hole transporting zone, the organic luminescent medium is preferably formed by depositing on the anode a layer 205 of an organic material chosen for its hole transporting efficiency. In the orientation of the device 200 shown, the portion of the organic luminescent medium adjacent its upper surface constitutes an electron transporting zone and is formed of a layer 207 of an organic material chosen for its electron transporting efficiency. With preferred choices of materials, described below, forming the layers 205 and 207, the latter also forms the zone in which luminescence occurs. The cathode 209 is conveniently formed by deposition on the upper layer of the organic luminescent medium.

Organic EL device 300 shown in FIG. 3 is illustrative of another preferred embodiment of the invention. Contrary to the historical pattern of organic EL device development, light emission from the device 300 is through the light transmissive (e.g., transparent or substantially transparent) cathode 309. While the anode of the device 300 can be formed identically as the device 200, thereby permitting light emission through both anode and cathode, in the preferred form shown, the device 300 employs an opaque charge conducting element to form the anode 301, such as a relatively high work function metallic substrate. The hole and electron transporting layers 305 and 307 can be identical to the corresponding layers 205 and 207 of the device 200 and require no further description. The significant difference between devices 200 and 300 is that the latter employs a thin, light transmissive (e.g., transparent or substantially transparent) cathode in place of the opaque cathode customarily included in organic EL devices.

Viewing organic EL devices 200 and 300 together, it is apparent that the present invention offers the option of mounting the devices on either a positive or negative polarity opaque substrate. While the organic luminescent medium of the EL devices 200 and 300 are described above as being comprised of a single organic hole injecting and transporting layer and a single electron injecting and transporting layer, further elaboration of each of these layers into multiple layers, as more specifically described below, can result in further enhancement of device performance. When multiple electron injecting and transporting layers are present, the layer receiving holes is the layer in which hole-electron recombination occurs and therefore forming the luminescent zone of the device.

Organic EL device 400 shown in FIG. 4 is illustrative of yet another preferred embodiment of the invention. Thus, there is shown an organic EL device comprised of multilayers of organic thin films sandwiched between anode 401 provided on a glass support 402 and cathode 403. On anode 401 is provided a hole-injecting layer 404 that is followed in sequence by a hole-transport layer 405, a doped luminescent layer 406 and an electron-transport layer 407. Doped luminescent layer 406 is primarily responsible for the spectral characteristics of the EL device.

In the practice of the present invention, the luminescent zone is in every instance formed by a thin film (herein employed to mean less than 1 μm in thickness) comprised of an organic host material capable of sustaining hole and electron injection and a fluorescent material capable of emitting light in response to hole-electron recombination. It is preferred that the luminescent zone be maintained in a thickness range of from 50 to 5000 Angstroms and, optimally, 100 to 1000 Angstroms, so that the entire organic luminescent medium can be less than 1 μm and preferably less than 1000 Angstroms in thickness.

The host material can be conveniently formed of any material heretofore employed as the active components of a thin film luminescent zone of an organic EL device. Among host materials suitable for use in forming thin films are diarylbutadienes and stilbenes, such as those disclosed by Tang U.S. Pat. No. 4,356,429, cited above.

Still other thin film forming host materials which can be employed are optical brighteners, particularly those disclosed by Van Slyke et al U.S. Pat. No. 4,539,507, cited above and here incorporated by reference. Useful optical brighteners include those satisfying structural formulae (I) and (II):

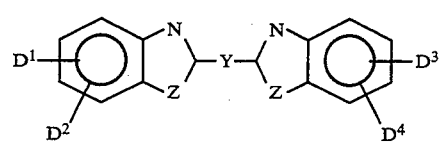

or

-continued

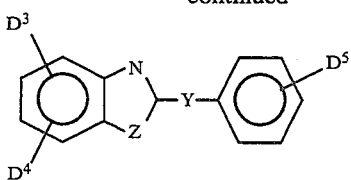

wherein:
D¹, D², D³, and D⁴ are individually hydrogen; saturated aliphatic of from 1 to 10 carbon atoms, for example, propyl, t-butyl, heptyl, and the like; aryl of from 6 to 10 carbon atoms, for example, phenyl and naphthyl; or halo such as chloro, fluoro, and the like; or D¹ and D² or D³ and D⁴ taken together comprise the atoms necessary to complete a fused aromatic ring optionally bearing at least one saturated aliphatic of from 1 to 10 carbon atoms, such as methyl, ethyl, propyl and the like;

D⁵ is a saturated aliphatic of from 1 to 20 carbon atoms, such as methyl, ethyl, n-eicosyl, and the like; aryl of from 6 to 10 carbon atoms, for example, phenyl and naphthyl; carboxyl; hydrogen; cyano; or halo, for example, chloro, fluoro and the like; provided that in formula (II) at least two of D³, D⁴ and D⁵ are saturated aliphatic of from 3 to 10 carbon atoms, e.g., propyl, butyl, heptyl and the like;

Z is —O—, —N(D⁶)—, or —S—; and
Y is

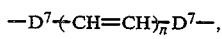

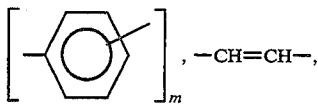

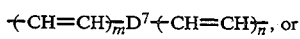 or

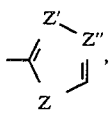

wherein:
m is an integer of from 0 to 4;
n is arylene of from 6 to 10 carbon atoms, for example, phenylene and naphthylene; and
D⁶ is hydrogen; a saturated aliphatic substituent of from 1 to 10 carbon atoms, such as an alkyl substituent; aryl of from 6 to 10 carbon atoms, such as phenyl or naphthyl; or a halo substituent, such as chloro or fluoro;
D⁷ is arylene of from 6 to 10 carbon atoms, such as phenyl or naphthyl;
Z' and Z" are individually N or CH.

As used herein, "aliphatic" includes substituted aliphatic as well as unsubstituted aliphatic. The substituents in the case of substituted aliphatic include alkyl of from 1 to 5 carbon atoms, for example, methyl, ethyl, propyl and the like; aryl of from 6 to 10 carbon atoms, for example, phenyl and naphthyl; halo, such as chloro, fluoro and the like; nitro; and alkoxy having 1 to 5 carbon atoms, for example, methoxy, ethoxy, propoxy, and the like.

Still other optical brighteners that are contemplated to be useful are listed in Vol. 5 of *Chemistry of Synthetic Dyes*, 1971, pages 618–637 and 640. Those that are not already thin-film-forming can be rendered so by attaching an aliphatic moiety to one or both end rings.

Particularly preferred host materials for forming the luminescent zone of the organic EL devices of this invention are metal chelated oxinoid compounds, including chelates of oxine (also commonly referred to as 8-quinolinol or 8-hydroxyquinoline). Such compounds exhibit both high levels of performance and are readily fabricated in the form of thin films. Exemplary of contemplated oxinoid compounds are those satisfying structure formula (III):

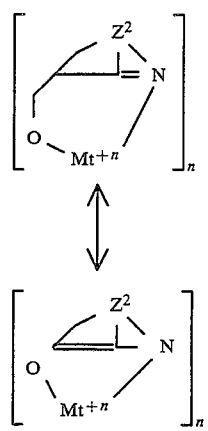

wherein:
Mt represents a metal;
n is an integer of from 1 to 3; and
Z² independently in each occurrence represents the atoms completing a nucleus having at least two fused aromatic rings.

From the foregoing, it is apparent that the metal can be monovalent, divalent, or trivalent metal. The metal can, for example, be an alkali metal, such as lithium, sodium, or potassium; an alkaline earth metal, such as magnesium or calcium; or an earth metal, such as boron or aluminum. Generally, any monovalent, divalent, or trivalent metal known to be a useful chelating metal can be employed.

Z² completes a heterocyclic nucleus containing at least two fused aromatic rings, at one of which is an azole or azine ring. Additional rings, including both aliphatic and aromatic rings, can be fused with the two required rings, if required. To avoid adding molecular bulk without improving on function, the number of ring atoms is preferably maintained at 18 or less.

Illustrative of useful host materials including metalized oxines capable of being used to form thin films are the following:

HM-1 Aluminum trisoxine [a.k.a., tris(8-quinolinol) aluminum].
HM-2 Magnesium bisoxine [a.k.a., bis (8-quinolinol) magnesium ]
HM-3 Bis [benzo{f}-8-quinolinol]zinc
HM-4 Bis (2-methyl-8-quinolinolato) aluminum oxide
HM-5 Indium trisoxine {a.k.a., tris (8-quinolinol) indium]
Aluminum tris (5-methyloxine) [a.k.a., tris (5-methyl-8-quinolinol)aluminum]
HM-7 Lithium oxine [a.k.a., 8-quinolinol lithium]

HM-8 Gallium trisoxine [a.k.a., tris(5-chloro-8-quinolinol) gallium]

HM-9 Calcium bis (5-chlorooxine) [a.k.a., bis (5-chloro-8-quinolinol ) calcium]

HM-10 Poly[zinc (II) -bis- (8-hydroxy-5-quinolinyl)methane ]

HM-11 Dilithium epindolidione

HM-12 1,4-Diphenylbutadiene

HM-13 1,1,4,4-Tetraphenylbutadiene

HM-14 4,4'-Bis [5,7-di (t-pentyl-2-benzoxazolyl]stilbene

HM-15 2,5-Bis [5,7-di(t-pentyl-2-benzoxazolyl]thiophene

HM-16 2,2'-(1,4-phenylenedivinylene)bisbenzothiazole

HM-17 4,4'-(2,2'-Bisthiazolyl)biphenyl

HM-18 2,5-Bis[5-($\alpha,\alpha$-dimethylbenzyl)-2-benzoxazolyl]thiophene

HM-19 2,5-Bis [5,7-di(t-pentyl)-2-benzoxazolyl]-3,4-diphenylthiophene

HM-20 Trans-stilbene

All of the host materials listed above are known to emit light in response to hole and electron injection. By blending with the host material a minor amount of a fluorescent material capable of emitting light in response to hole-electron recombination, the hue light emitted from the luminescent zone can be modified. In theory, if a host material and a fluorescent material could be found for blending which have exactly the same affinity for hole-electron recombination, each material should emit light upon injection of holes and electrons in the luminescent zone. The perceived hue of light emission would be the visual integration of both emissions.

Since imposing such a balance of host and fluorescent materials is highly limiting, it is preferred to choose the fluorescent material so that it provides the favored sites for light emission. When only a small proportion of fluorescent material providing favored sites for light emission is present, peak intensity wavelength emissions typical of the host material can be entirely eliminated in favor of a new peak intensity wavelength emission attributable to the fluorescent material. While the minimum proportion of fluorescent material sufficient to achieve this effect varies by the specific choice of host and fluorescent materials, in no instance is it necessary to employ more than about 10 mole percent fluorescent material, based on moles of host material and seldom is it necessary to employ more than 1 mole percent of the fluorescent material. On the other hand, for any host material capable of emitting light in the absence of fluorescent material, limiting the fluorescent material present to extremely small amounts, typically less than about $10^{-3}$ mole percent, based on host material, can result in retaining emission at wavelengths characteristic of the host material. Thus, by choosing the proportion of a fluorescent material capable of providing favored sites for light emission, either a full or partial shifting of emission wavelengths can be realized. This allows the spectral emissions of the EL devices of this invention to be selected and balanced to suit the application to be served.

Choosing fluorescent materials capable of providing favored sites for light emission necessarily involves relating the properties of the fluorescent material to those of the host material. The host material can be viewed as a collector for injected holes and electrons with the fluorescent material providing the molecular sites for light emission. One important relationship for choosing a fluorescent material capable of modifying the hue of light emission when present in a host material is a comparison of the reduction potentials of the two materials. The fluorescent materials demonstrated to shift the wavelength of light emission have exhibited a less negative reduction potential than that of the host material. Reduction potentials, measured in electron volts, have been widely reported in the literature along with varied techniques for their measurement. Since it is a comparison of reduction potentials rather than their absolute values which is desired, it is apparent that any accepted technique for reduction potential measurement can be employed, provided both the fluorescent and host material reduction potentials are similarly measured. A preferred oxidation and reduction potential measurement techniques is reported by R. J. Cox, *Photographic Sensitivity*, Academic Press, 1973, Chapter 15.

A second important relationship for choosing a fluorescent material capable of modifying the hue of light emission when present in a host material is a comparison of the bandgap potentials of the two materials. The fluorescent materials demonstrated to shift the wavelength of light emission have exhibited a lower bandgap potential than that of the host material. The bandgap potential of a molecule is taken as the potential difference in electron volts (eV) separating its ground state and first single state. Bandgap potentials and techniques for their measurement have been widely reported in the literature. The bandgap potentials herein reported are those measured in electron volts (eV) at an absorption wavelength which is bathochromic to the absorption peak and of a magnitude one tenth that of the magnitude of the absorption peak. Since it is a comparison of bandgap potentials rather than their absolute values which is desired, it is apparent that any accepted technique for bandgap measurement can be employed, provided both the fluorescent and host material band gaps are similarly measured. One illustrative measurement technique is disclosed by F. Gutman and L. E. Lyons, *Organic Semiconductors*, Wiley, 1967, Chapter 5.

Where a host material is chosen which is itself capable of emitting light in the absence of the fluorescent material, it has been observed that suppression of light emission at the wavelengths of emission characteristics of the host material alone and enhancement of emission at wavelengths characteristic of the fluorescent material occurs when spectral coupling of the host and fluorescent materials is achieved. By spectral coupling it is meant that an overlap exists between the wavelengths of emission characteristic of the host material alone and the wavelengths of light absorption of the fluorescent material in the absence of the host material. Optimal spectral coupling occurs when the maximum emission of the host material alone substantially matches within ±25 nm the maximum absorption of the fluorescent material alone. In practice, advantageous spectral coupling can occur with peak emission and absorption wavelengths differing by up to 100 nm or more, depending on the width of the peaks and their hypsochromic and bathochromic slopes. Where less than optimum spectral coupling between the host and fluorescent materials is contemplated, a bathochromic as compared to a hypsochromic displacement of the fluorescent material produces more efficient results.

Although the foregoing discussion has been undertaken by reference to host materials which are known to themselves emit light in response to hole and electron injection, in fact light emission by the host material itself can entirely cease where light emission by the fluorescent material is favored by any one or combination of the various relationships noted above. It is appreciated that shifting the role of light emission to the fluorescent material allows a still broader range of choices of host materials. For example, one fundamental requirement of a material chosen to emit light is that it must exhibit a low extinction coefficient for light of the wavelength it emits to avoid internal absorption. The present invention permits use of host materials which are capable of sustaining the injection of holes and electrons, but are themselves incapable of efficiently emitting light.

Useful fluorescent materials are those capable of being blended with the host material and fabricated into thin films satisfying the thickness ranges described above forming the luminescent zones of the EL devices of this invention. While crystalline host materials do not lend themselves to thin film formation, the limited amounts of fluorescent materials present in the host materials permits the use of fluorescent materials which are alone incapable of thin film formation. Preferred fluorescent materials are those which form a common phase with the host material. Fluorescent phthalocyanine compounds that have been found to be suitable are those that emit in the red or deep-red region and that lend themselves to molecular level distribution in the host material. Although any convenient technique for dispersing the fluorescent material in the host materials can be undertaken, preferred fluorescent phthalocyanine materials are those which can be vacuum vapor deposited along with the host materials.

Thus, for purposes of providing an EL light source with an emission wavelength beyond the visible range in accordance with the invention, it has been found that fluorescent phthalocyanine compounds are highly suitable as the emitter. Such phthalocyanine compounds provide luminescence having a wavelength in the range of 660 to 780 nm, and typically 680 to 730 nm with the peak photosensitivity being near 700 nm. Phthalocyanine compounds highly suitable in accordance with the invention have the following structure (IV):

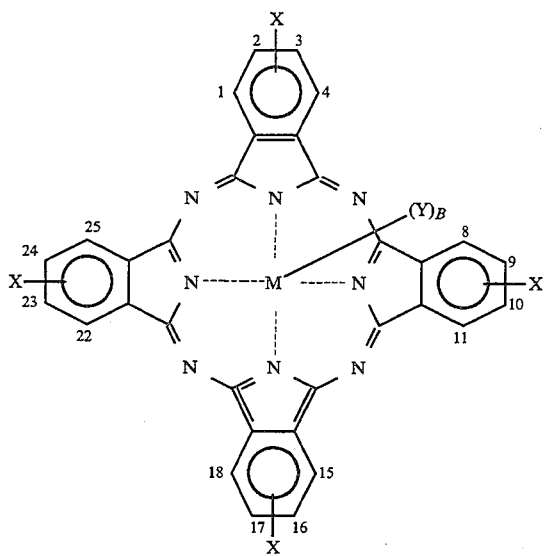

wherein:

X can be selected from $C_nH_{2n+1}$ where n=0 to 20, or halogens or cyano groups. Further, X can be selected from hydrogen, methyl, ethyl, t-butyl, n-pentyl, Cl, F, Br, CN, $OCH_3$, and $OC_2H_5$. X can be substituted onto $C_1$-$C_4$, $C_8$-$C_{11}$, $C_{15}$-$C_{18}$, or $C_{22}$-$C_{25}$ positions of the phthalocyanine M is 2H or a metal selected from the group consisting of Mg, Li, Na, Ca, Zn, Al, Ga and In.

$(Y)_B$ wherein B is 0 or 1, and Y is halogen, alkoxyl or phenoxyl containing organic compound when B is 1. As used herein, the term B is 0 means that (Y) does not exist when M is divalent, e.g., magnesium. The halogen can be selected from chlorine or fluorine. The alkoxyl or phenoxyl organic compound can have the formula:

where X" is alkyl, phenyl or fluorinated phenyl.

Suitable compounds that can be used for $(Y)_B$ include:

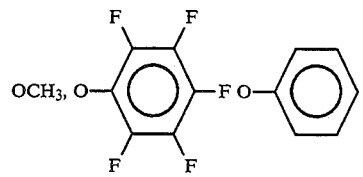

In structure (IV), Mg, Al or H are preferred materials.

The following structure is a variation of structure (IV) and is referred to herein as structure (IVa):

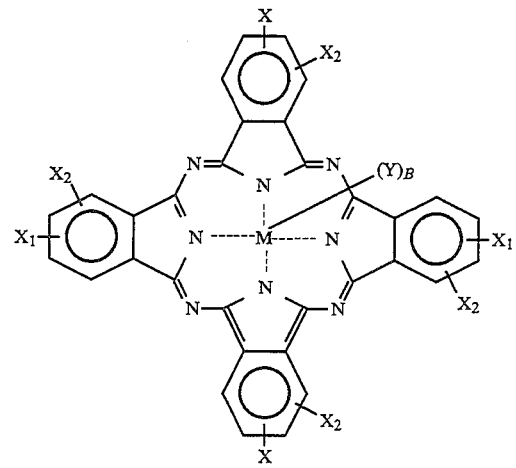

wherein $X_1$ and $X_2$ may be in the following relative positions:

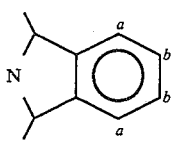

and wherein $X_1$ and $X_2$ can be the same as X, and $X_1$ may be the same as $X_2$. $X_1$ and $X_2$ may both be in the "a" and "b" positions; or $X_1$ may be in the "a" position and $X_2$ may be in the "b" position; or $X_1$ may be in the "b" position and $X_2$ may be in the "a" position or any other combination of these. $X_1$ and $X_2$ may together comprise the element of a substituted or unsubstituted aromatic ring. The other constituents are the same as for structure (IV).

The following are illustrative of fluorescent phthalocyanine compounds useful in the invention:
Magnesium phthalocyanine;
Metal-free phthalocyanine;
Dilithium phthalocyanine;
Chloro-alumninum phthalocyanine;
Fluoro-aluminum phthalocyanine;
Tetra-t-butyl phthalocyanine;
Magnesium tetra-t-butylphthalocyanine;
Magnesium naphthalocyanine; and
Metal-free naphthalocyanine.

In the present invention, the fluorescent phthalocyanine compound can comprise 0.01 to 3 vol. % of the host material constituting the doped luminescent zone, with a preferred amount being 0.05 to 1 vol. %. For compounds such as MgPc in Alq host material, the amount can be in the range of 0.5 to 1.5 vol. %.

In one form of the invention, the material forming the luminescent zone can be one uniform layer interposed between and contacting both the cathode and the hole injection zone of the EL device. As an alternative construction, a separate layer containing the host material, but lacking the fluorescent material, can be interposed between the luminescent zone and the cathode. Although the additional interposed organic electron injection layer can be of any conventional form, it is preferred that both the electron injection layer and the layer forming the luminescent zone be present in the form of a thin film (<1 μm in thickness) and most preferred that these layers have a combined thickness no greater than those thicknesses indicated above for the luminescent zone.

The organic luminescent medium of the EL devices of this invention preferably contains at least two separate organic layers, at least one layer forming a zone for transporting electrons injected from the cathode and at least one layer forming a zone for transporting holes injected from the anode. As is more specifically taught by Van Slyke et al U.S. Pat. No. 4,720,432, the latter zone is in turn preferably formed of at least two layers, one located in contact with the anode, providing a hole injecting zone and the remaining layer, interposed between the layer forming the hole injecting zone and the layer providing the electron transporting zone, providing a hole transporting zone. While the description which follows is directed to the preferred embodiments of organic EL devices according to this invention which employ at least three separate organic layers, as taught by Van Slyke et al, it is appreciated that either the layer forming the hole injecting zone or the layer forming the hole transporting zone can be omitted and the remaining layer will perform both functions. Higher initial and sustained performance levels of the organic EL devices of this invention are realized when the separate hole injecting and hole transporting layers described below are employed in combination.

A layer containing a porphyrinic compound forms the hole injecting zone of the organic EL device. A porphyrinic compound is any compound, natural or synthetic, which is derived from or includes a porphyrin structure, including porphine itself. Any of the porphyrinic compounds disclosed by Adler U.S. Pat. No. 3,935,031 or Tang U.S. Pat. No. 4,356,429, the disclosures of which are here incorporated by reference, can be employed.

Preferred porphyrinic compounds are those of structural formula (XVIII):

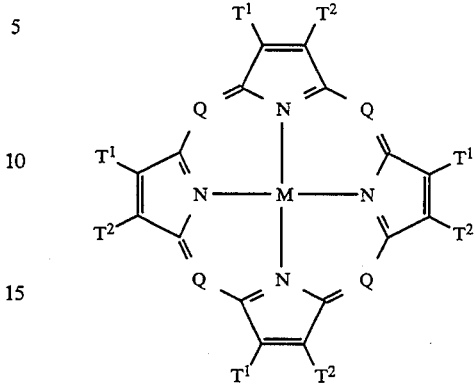

wherein:
Q is —N= or —C(R)=;
M is a metal, metal oxide, or metal halide;
R is hydrogen, alkyl, aralkyl, aryl, or alkaryl, and $T^1$ and $T^2$ represent hydrogen or together complete an unsaturated 6-membered ring, which can include substituents, such as alkyl or halogen.

Preferred 6-membered rings are those formed of carbon, sulfur, and nitrogen ring atoms. Preferred alkyl moieties contain from about 1 to 6 carbon atoms while phenyl constitutes a preferred aryl moiety.

In an alternative preferred form the porphyrinic compounds differ from those of structural formula (XVIII) by substitution of two hydrogen for the metal atom, as indicated by formula (IXX):

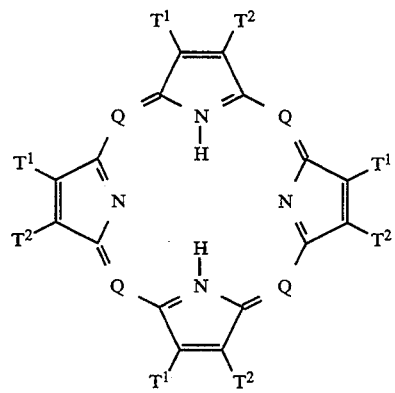

Highly preferred examples of useful porphyrinic compounds are metal free phthalocyanines and metal containing phthalocyanines. While the porphyrinic compounds in general and the phthalocyanines in particular can contain any metal, the metal preferably has a positive valence of two or higher. Exemplary preferred metals are cobalt, magnesium, zinc, palladium, nickel, and, particularly, copper, lead, and platinum.

Illustrative of useful porphyrinic compounds are the following:
PC-1 Porphine
PC-2 1,10,15,20-Tetraphenyl-21H,23H-porphine copper
PC-3 1,10,15,20-Tetraphenyl-21H,23H-porphine zinc (II)
PC-4 5,10,15,20-Tetrakis(pentafluorophenyl)-21H,23H-porphine PC-5 Silicon phthalocyanine oxide
PC-6 Aluminum phthalocyanine chloride
PC-7 Phthalocyanine (metal free)
PC-8 Dilithiumphthalocyanine
PC-9 Copper tetramethylphthalocyanine
PC-10 Copper phthalocyanine
PC-11 Chromium phthalocyanine fluoride
PC-12 Zinc phthalocyanine
PC-13 Lead phthalocyanine
PC-14 Titanium phthalocyanine oxide
PC-15 Magnesium phthalocyanine
PC-16 Copper octamethylphthalocyanine The hole transporting layer of the organic EL device contains at least one hole transporting aromatic tertiary amine, where the latter is understood to be a compound containing at least one trivalent nitrogen atom that is bonded only to carbon atoms, at least one of which is a member of an aromatic ring. In one form, the aromatic tertiary amine can be an arylamine, such as a monoarylamine, diarylamine, triarylamine, or a polymeric arylamine. Exemplary monomeric triarylamines are illustrated by Klupfel et al U.S. Pat. No. 3,180,730. Other suitable triarylamines substituted with vinyl or vinylene radicals and/or containing at least one active hydrogen containing group are disclosed by Brantley et al U.S. Pat. Nos. 3,567,450 and 3,658,520.

A preferred class of aromatic tertiary amines are those which include at least two aromatic tertiary amine moieties. Such compounds include those represented by structural formula (XX):

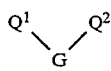

wherein:

$Q^1$ and $Q^2$ are independently aromatic tertiary amine moieties and

G is a linking group such as arylene, cycloalkylene, or alkylene group or a carbon to carbon bond A particularly preferred class of triarylamines satisfying structural formula (XX) and containing two triarylamine moieties are those satisfying structural formula (XXI):

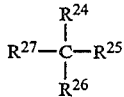

wherein:

$R^{24}$ and $R^{25}$ each independently represents a hydrogen atom, an aryl group, or an alkyl group or $R^{24}$ and $R^{25}$ together represent the atoms completing a cycloalkyl group and $R^{26}$ and $R^{27}$ each independently represents an aryl group which is in turn substituted with a diaryl substituted amino group, as indicated by structural formula (XXII):

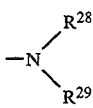

wherein:

$R^{28}$ and $R^{29}$ are independently selected aryl groups.

Another preferred class of aromatic tertiary amines are tetraryldiamines. Preferred tetraaryldiamines include two diarylamino groups, such as indicated by formula (XXII), linked through an arylene group. Preferred tetraaryldiamines include those represented by formula (XXIII):

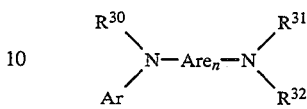

wherein:

Are is an arylene group;

n is an integer of from 1 to 4; and

Ar, $R^{30}$, $R^{31}$, and $R^{32}$ are independently selected aryl groups.

The various alkyl, alkylene, aryl, and arylene moieties of the foregoing structural formulae (XX), (XXI), (XXII), and (XXIII) can each in turn be substituted. Typical substituents include alkyl groups, alkoxy groups, aryl groups, aryloxy groups, and halogen such as fluoride, chloride, and bromide. The various alkyl and alkylene moieties typically contain from about 1 to 6 carbon atoms. The cycloalkyl moieties can contain from 3 to about 10 carbon atoms, but typically contain five, six, or seven ring carbon atoms-e.g., cyclopentyl, cyclohexyl, and cycloheptyl ring structures. The aryl and arylene moieties are preferably phenyl and phenylene moieties.

While the entire hole transporting layer of the organic electroluminesence medium can be formed of a single aromatic tertiary amine, it is a further recognition of this invention that increased stability can be realized by employing a combination of aromatic tertiary amines. Specifically, as demonstrated in the examples below, it has been observed that employing a triarylamine, such as a triarylamine satisfying formula (XXI), in combination with a tetraaryldiamine, such as indicated by formula (XXIII), can be advantageous. When a triarylamine is employed in combination with a tetraaryldiamine, the latter is positioned as a layer interposed between the triarylamine and the electron injecting and transporting layer.

Representative useful aromatic tertiary amines are disclosed by Berwick et al U.S. Pat. No. 4,175,960 and Van Slyke et al U.S. Pat. No. 4,539,507, here incorporated by reference. Berwick et al in addition discloses as useful hole transporting compounds N substituted carbazoles, which can be viewed as ring bridged variants of the diaryl and triarylamines disclosed above.

Illustrative of useful aromatic tertiary amines are the following:

ATA-1 1,1-Bis(4-di-p-tolylaminophenyl)cyclohexane
ATA-2 1,1-Bis(4-di-p-tolylaminophenyl)-4-phenylcyclohexane
ATA-3 4,4,-Bis(diphenylamino)quadriphenyl
ATA-4 Bis(4-dimethylamino-2-methylphenyl)-phenylmethane
ATA-5 N,N,N-Tri(p-tolyl)amine
ATA-6 4-(di-p-tolylamino)-4'-[4(di-p-tolylamino)-styryl]stilbene
ATA-7 N,N,N,'N'-Tetra-p-tolyl-4,4'-diaminobiphenyl
ATA-8 N,N,N,'N'-Tetraphenyl-4,4'-diaminobiphenyl
ATA-9 N-Phenylcarbazole ATA-10 poly(N-vinylcarbazole)

ATA-11 4,4'-Bis[N-(1-naphthyl)-N-phenylamino]-biphonyl

Any conventional electron injecting and transporting compound or compounds can be employed in forming the layer of the organic luminescent medium adjacent the cathode. This layer can be formed by historically taught luminescent materials, such as anthracene, naphthalene, phenanthrene, pyrene, chrysene, and perylene and other fused ring luminescent materials containing up to about 8 fused rings, as illustrated by Gurnee et al U.S. Pat. No. 3,172,862, Gurnee U.S. Pat. No. 3,173,050, Dresner, "Double Injection Electroluminescence in Anthracene", *RCA Review*, Vol. 30, pp. 322–334, 1969; and Dresner U.S. Pat. No. 3,710,167, cited above. Although such fused ring luminescent materials do not lend themselves to forming thin (<1 μm) films and therefore do not lend themselves to achieving the highest attainable EL device performance levels, organic EL devices incorporating such luminescent materials when constructed according to the invention show improvements in performance and stability over otherwise comparable prior art EL devices.

In the organic EL devices of the invention, it is possible to maintain a current density compatible with efficient light emission while employing a relatively low voltage across the electrodes by limiting the total thickness of the organic luminescent medium to less than 1 μm (10,000 Angstroms). At a thickness of less than 1 μm, an applied voltage of 20 volts results in a field potential of greater than $2 \times 10^5$ volts/cm, which is compatible with efficient light emission. An order of magnitude reduction (to 0.1 μm or 1000 Angstroms) in thickness of the organic luminescent medium, allowing further reductions in applied voltage and/or increase in the field potential and hence current density, are well within device construction capabilities.

One function which the organic luminescent medium performs is to provide a dielectric barrier to prevent shorting of the electrodes on electrical biasing of the EL device. Even a single pin hole extending through the organic luminescent medium will allow shorting to occur. Unlike conventional EL devices employing a single highly crystalline luminescent material, such as anthracene, for example, the EL devices of this invention are capable of fabrication at very low overall organic luminescent medium thicknesses without shorting. One reason is that the presence of three superimposed layers greatly reduces the chance of pin holes in the layers being aligned to provide a continuous conduction path between the electrodes. This in itself permits one or even two of the layers of the organic luminescent medium to be formed of materials which are not ideally suited for film formation on coating while still achieving acceptable EL device performance and reliability.

The preferred materials for forming the organic luminescent medium are each capable of fabrication in the form of a thin film-that is, capable of being fabricated as a continuous layer having a thickness of less than 0.5 μm or 5000 Angstroms.

When one or more of the layers of the Organic luminescent medium are solvent coated, a film forming polymeric binder can be conveniently codeposited with the active material to assure a continuous layer free of structural defects, such as pin holes. If employed, a binder must, of course, itself exhibit a high dielectric strength, preferably at least about $2 \times 10^6$ volt/cm. Suitable polymers can be chosen from a wide variety of known solvent cast addition and condensation polymers. Illustrative of suitable addition polymers are polymers and copolymers ( including terpolymers ) of styrene, t-butylstyrene, N-vinyl carbazole, vinyltoluene, methyl methacrylate, methyl acrylate, acrylonitrile, and vinyl acetate. Illustrative of suitable condensation polymers are polyesters, polycarbonates, polyimides, and polysulfones. To avoid unnecessary dilution of the active material, binders are preferably limited to less than 50 wt. %, based on the total weight of the material forming the layer.

The preferred active materials forming the organic luminescent medium are each film forming materials and capable of vacuum vapor deposition. Extremely thin defect free continuous layers can be formed by vacuum vapor deposition. Specifically, individual layer thicknesses as low as about 50 Angstroms can be present while still realizing satisfactory EL device performance. Employing a vacuum vapor deposited porphorinic compound as a hole injecting layer, a film forming aromatic tertiary amine as a hole transporting layer (which can in turn be comprised of a triarylamine layer and a tetraaryldiamine layer), and a chelated oxinoid layer, individual layer thicknesses in the range of from about 50 to 5000 Angstroms are contemplated, with layer thicknesses in the range of from 100 to 2000 Angsttoms being preferred. It is generally preferred that the overall thickness of the organic luminescent medium be at least about 1000 Angstroms.

The anode and cathode of the organic EL device can each take any convenient conventional form. Where it is intended to transmit light from the organic EL device through the anode, this can be conveniently achieved by coating a thin conductive layer onto a light transmissive substrate-e.g., a transparent or substantially transparent glass plate or plastic film. In one form, the organic EL devices of this invention can follow the historical practice of including a light transmissive anode formed of tin oxide or indium tin oxide coated on a glass plate, as disclosed by Gurnee et al U.S. Pat. No. 3,172,862, Gurnee U.S. Pat. 3,173,050, Dresner, "Double Injection Electroluminescence in Anthracene", *RCA Review*, Vol. 30, pp. 322–334, 1969; and Dresner U.S. Pat. No. 3,710,167, cited above. While any light transmissive polymeric film can be employed as a substrate, Gillson U.S. Pat. No. 2,733,367 and Swindells U.S. Pat. No. 2,941,104 disclose polymeric films specifically selected for this purpose.

As employed herein, the term "light transmissive" means simply that the layer or element under discussion transmits greater than 50% of the light of at least one wavelength it receives and preferably over at least a 100 nm interval. Since both specular (unscattered) and diffused (scattered) emitted light are desirable device outputs, both translucent and transparent or substantially transparent materials are useful. In most instances, the light transmissive layers or elements of the organic EL device are also colorless or of neutral optical density-that is, exhibiting no markedly higher absorption of light in one wavelength range as compared to another. However, it is, of course, recognized that the light transmissive electrode supports or separate superimposed films or elements can be tailored in their light absorption properties to act as emission trimming filters, if desired. Such an electrode construction is disclosed, for example, by Fleming U.S. Pat. No. 4,035,686. The light transmissive conductive layers of the electrodes, where fabricated of thicknesses approximating the wavelengths or multiples of the light wavelengths received can act as interference filters.

Contrary to historical practice, in one preferred form, the organic EL devices of this invention emit light through the cathode rather than the anode. This relieves the anode of any requirement that it be light transmissive, and it is, in fact, preferably opaque to light in this form of the invention. Opaque anodes can be formed of any metal or combination of metals having a suitably high work function for anode construction. Preferred anode metals have a work function of greater than 4 electron volts (eV). Suitable anode metals can be chosen from among the high (4 eV) work function metals listed below. An opaque anode can be formed of an opaque metal layer on a support or as a separate metal foil or sheet.

The organic EL devices of this invention can employ a cathode constructed of any metal, including any high or low work function metal, heretofore taught to be useful for this purpose. Unexpected fabrication, performance, and stability advantages have been realized by forming the cathode of a combination of a low work function metal and at least one other metal. A low work function metal is herein defined as a metal having a work function of less than 4 eV. Generally, the lower the work function of the metal, the lower the voltage required for electron injection into the organic luminescent medium. However, alkali metals, the lowest work function metals, are too reactive to achieve stable EL device performance with simple device constructions and construction procedures and are excluded (apart from impurity concentrations) from the preferred cathodes of this invention.

Available low work function metal choices for the cathode (other alkali metals) are listed below by periods of the Periodic Table of Elements and categorized into 0.5 eV work function groups. All work functions provided are taken Sze, *Physics of Semiconductor Devices*, Wiley, New York, 1969, p. 366.

| Period | Element | Work Function by eV Group |
|---|---|---|
| 2 | Beryllium | 3.5–4.0 |
| 3 | Magnesium | 3.5–4.0 |
| 4 | Calcium | 2.5–3.0 |
|   | Scandium | 3.0–3.5 |
|   | Titanium | 3.5–4.0 |
|   | Manganese | 3.5–4.0 |
|   | Gallium | 3.5–4.0 |
| 5 | Strontium | 2.0–2.5 |
|   | Yttrium | 3.0–3.5 |
|   | Indium | 3.5–4.0 |
| 6 | Barium | ~2.5 |
|   | Lanthanum | 3.0–3.5 |
|   | Cerium | 2.5–3.0 |
|   | Praseodymium | 2.5–3.0 |
|   | Neodymium | 3.0–3.5 |
|   | Promethium | 3.0–3.5 |
|   | Samarium | 3.0–3.5 |
|   | Europium | 2.5–3.0 |
|   | Gadolinium | 3.0–3.5 |
|   | Terbium | 3.0–3.5 |
|   | Dysprosium | 3.0–3.5 |
|   | Holmium | 3.0–3.5 |
|   | Erbium | 3.0–3.5 |
|   | Thulium | 3.0–3.5 |
|   | Ytterbium | 2.5–3.0 |
|   | Lutetium | 3.0–3.5 |
|   | Hafnium | ~3.5 |
| 7 | Radium | 3.0–3.5 |
|   | Actinium | 2.5–3.0 |
|   | Thorium | 3.0–3.5 |

-continued

| Period | Element | Work Function by eV Group |
|---|---|---|
|   | Uranium | 3.0.3.5 |

From the foregoing listing, it is apparent that the available low work function metals for the most part belong to the Group IIa or alkaline earth group of metals, the Group III group of metals (including the rare earth metals-i.e., yttrium and the lanthanides, but excluding boron and aluminum), and the actinide groups of metals. The alkaline earth metals, owing to their ready availability, low cost, ease of handling, and minimal adverse environmental impact potential, constitute a preferred class of low work function metals for use in the cathodes of EL devices of this invention. Magnesium and calcium are particularly preferred. Though significantly more expensive, the included Group III metals, particularly the rare earth metals, possess similar advantages and are specifically contemplated as preferred low work function metals. The low work function metals exhibiting work functions in the range from 3.0 to 4.0 eV are generally more stable than metals exhibiting lower work functions and are, therefore, generally preferred.

A second metal included in the construction of the cathode has as one primary purpose to increase the stability (both storage and operational) of the cathode. It can be chosen from among any metal other than an alkali metal. The second metal can itself be a low work function metal and thus be chosen from the metals listed above having a work function of less than 4 eV, with the same preferences above discussed being fully applicable. To the extent that the second metal exhibits a low work function it can, of course, supplement the first metal in facilitating electron injection.

Alternatively, the second metal can be chosen from any of the various metals having a work function greater than 4 eV, which includes the elements more resistant to oxidation and, therefore, more commonly fabricated as metallic elements. To the extent the second metal remains invariant in the organic EL device as fabricated, it contributes to the stability of the device.

Available higher work function (4 eV or greater) metal choices for the cathode are listed below by periods of the Periodic Table of Elements and categorized into 0.5 eV work function groups.

| Period | Element | Work Function by eV Group |
|---|---|---|
| 2 | Boron | ~4.5 |
|   | Carbon | 4.5–5.0 |
| 3 | Aluminum | 4.0–4.5 |
| 4 | Vanadium | 4.0–4.5 |
|   | Chromium | 4.5–5.0 |
|   | Iron | 4.0–4.5 |
|   | Cobalt | 4.0–4.5 |
|   | Nickel | ~4.5 |
|   | Copper | 4.0–4.5 |
|   | Zinc | 4.0–4.5 |
|   | Germanium | 4.5–5.0 |
|   | Arsenic | 5.0–5.5 |
|   | Selenium | 4.5–5.0 |
| 5 | Molybdenum | 4.0–4.5 |
|   | Technetium | 4.0–4.5 |
|   | Ruthenium | 4.5–5.0 |
|   | Rhodium | 4.5–5.0 |
|   | Palladium | 4.5–5.0 |
|   | Silver | 4.0–4.5 |
|   | Cadmium | 4.0–4.5 |

-continued

| Period | Element | Work Function by eV Group |
|---|---|---|
|  | Tin | 4.0–4.5 |
|  | Antimony | 4.0–4.5 |
|  | Tellurium | 4.5–5.0 |
| 6 | Tantalum | 4.0–4.5 |
|  | Tungsten | ~4.5 |
|  | Rhenium | ~5.0 |
|  | Osmium | 4.5–5.0 |
|  | Iridium | 3.5–.0 |
|  | Platinum | 5.5–.0 |
|  | Gold | 4.5–5.0 |
|  | Mercury | ~4.5 |
|  | Lead | ~4.0 |
|  | Bismuth | 4.0–4.5 |
|  | Polonium | 4.5–5.0 |

From the foregoing listing of available metals having a work function of 4 eV or greater, attractive higher work function metals for the most part are accounted for aluminum, the Group Ib metals (copper, silver, and gold), the metals in Groups IV, V, and VI, and the Group VIII transition metals, particularly the noble metals from this group. Aluminum, copper, silver, gold, tin, lead, bismuth, tellurium, and antimony are particularly preferred higher work function second metals for incorporation in the cathode.

There are several reasons for not restricting the choice of the second metal based on either its work function or oxidative stability. The second metal is only a minor component of the cathode. One of its primary functions is to stabilize the first, low work function metal, and, surprisingly, it accomplishes this objective independent of its own work function and susceptibility to oxidation.

A second valuable function which the second metal performs is to reduce the sheet resistance of the cathode as a function of the thickness of the cathode. Since acceptably low sheet resistance levels (<100 ohms per square) can be realized at low cathode thicknesses (<250 Angstroms), cathodes can be formed which exhibit high levels of light transmission. This permits highly stable, thin, transparent cathodes of acceptably low resistance levels and high electron injecting efficiencies to be achieved for the first time. This in turn permits (but does not require) the organic EL devices of this invention to be constructed with light transmissive cathodes and frees the organic EL devices of any necessity of having a light transmissive anode to achieve light emission through an electrode area.

A third valuable function which the second metal has been observed to perform is to facilitate vacuum vapor deposition of a first metal onto the organic luminescent medium of the EL device. In vapor deposition, less metal is deposited on the walls of the vacuum chamber and more metal is deposited on the organic luminescent medium when a second metal is also deposited. The efficacy of the second metal in stabilizing organic EL device, reducing the sheet resistance of thin cathodes, and in improving acceptance of the first metal by the organic luminescence medium is demonstrated by the examples below.

Only a very small proportion of a second metal need be present to achieve these advantages. Only about 0.1% of the total metal atoms of the cathode need be accounted for by the second metal to achieve a substantial improvement. Where the second metal is itself a low work function metal, both the first and second metals are low work function metals, and it is immaterial which is regarded as the first metal and which is regarded as the second metal. For example, the cathode composition can range from about 0.1% of the metal atoms of the cathode being accounted for by one low work function metal to about 0.1% of the total metal atoms being accounted for by a second low work function metal. Preferably, one of the two metals account for at least 1% and optimally at least 2% of the total metal present.

When the second metal is a relatively higher (at least 4.0 eV) work function metal, the low work function metal preferably accounts for greater than 50% of the total metal atoms of the cathode. This is to avoid reduction in electron injection efficiency by the cathode, but it is also predicated on the observation that the benefits of adding a second metal are essentially realized when the second metal accounts for less than 20% of the total metal atoms of the cathode.

Although the foregoing discussion has been in terms of a binary combination of metals forming the cathode, it is, of course, appreciated that combinations of three, four, or even higher numbers of metals are possible and can be employed, if desired. The proportions of the first metal noted above can be accounted for by any convenient combination of low work function metals and the proportions of the second metal can be accounted for any combination of high and/or low work function metals.

While the second metal or metals can be relied upon to enhance electrical conductivity, their minor proportion of the total cathode metal renders it unnecessary that these metals be present in an electrically conducting form. The second metal or metals can be present as compounds (e.g., lead, tin, or antimony telluride) or in an oxidized form, such as in the form of one or more metal oxides or salts. Since the first, low work function metal or metals account for the major proportion of the cathode metal content and are relied upon for electron conduction, they are preferably employed in their elemental form, although some oxidation may occur on aging.

In depositing the first metal alone onto a substrate or onto the organic luminescent medium, whether from solution or, preferably, from the vapor phase, initial spatially separated deposits of the first metal form nuclei for subsequent deposition. Subsequent deposition leads to the growth of these nuclei into microcrystals. The result is an uneven and random distribution of microcrystals, leading to a non-uniform cathode. By presenting a second metal during at least one of the nucleation and growth stages, and preferably, both, the high degree of symmetry which a single element affords is reduced. Since no two substances form crystal cells of exactly the same habit and size, any second metal reduces the degree of symmetry and at least to some extent acts to retard microcrystal growth. Where the first and second metals have distinctive crystal habits, spatial symmetry is further reduced and microcrystal growth is further retarded. Retarding microcrystal growth favors the formation of additional nucleation sites. In this way, the number of deposition sites is increased and a more uniform coating is achieved.

Depending upon the specific choice of metals, the second metal, where more compatible with the substrate, can produce a disproportionate number of the nucleation sites, with the first metal then depositing at these nucleation sites. Such a mechanism may, in fact, account for the observation that, with a second metal present, the efficiency with which the first metal is accepted by a substrate is significantly enhanced. It has been observed, for example, that less deposition of the first metal occurs on vacuum chamber walls when a second metal is being codeposited.

The first and second metals of the cathode are intimately intermingled, being codeposited. That is, the deposition of neither the first nor second metals is completed before at least a portion of the remaining metal is deposited. Simultaneous deposition of the first and second metals is generally preferred. Alternatively, successive incremental depositions of the first and second metals can be undertaken, which at their limit may approximate concurrent deposition.

While not required, the cathode, once formed can be given post treatments. For example, the cathode may be heated within the stability limits of the substrate in a reducing atmosphere. Other action on the cathode can be undertaken as a conventionally attendant feature of leading bonding or device encapsulation.

EXAMPLES

The invention and its advantages are further illustrated by the specific examples which follow.

Example 1

An EL device containing an organic luminescent medium satisfying the requirements of the invention was constructed in the following manner:

(a) a transparent anode of indium tin oxide coated on glass was provided. The indium tin oxide was about 750 Angstroms thick, and the glass was 1.1 mm thick. The anode was placed into a vacuum deposition chamber and the chamber was evacuated to a base pressure of about 1E-6 Torr.

(b) a hole injecting layer of copper phthalocyanine 100 Angstroms thick was deposited on the indium tin oxide layer. The source temperature was about 500° C., and the deposition rate was about 5 Angstroms/second.

(c) a hole transporting layer of ATA-10 Poly(N-vinylcarbazole) 600 Angstroms thick was deposited on the hole injecting layer at a source temperature of 300° C. and at a deposition rate of about 5 Angstroms/second.

(d) an emitter layer of magnesium phthalocyanine (MgPc) doped tris(8-quinolinol) aluminum (Alq) was deposited on the hole transporting layer. The emitter layer was deposited by co-evaporating MgPc and Alq simultaneously from two independently controlled sources. A suitable concentration of MgPc doped Alq was obtained by adjusting the ratio of the deposition rates during co-evaporation. The deposition rate for Alq was about 5 Angstroms/second, and the deposition rate for MgPc was 0.005 Angstroms/second giving a volume ratio of MgPc to Alq of about 0.1% which is suitable for this particular system.

(e) an electron transport layer of Alq was applied over the emitter layer. The source temperature was about 325° C., and the rate of deposition was about 5 Angstroms/second.

(f) a cathode layer of magnesium and silver alloy was deposited on the electron transport layer. The Mg:Ag layer was provided by co-deposition of magnesium and silver sources. The thickness was 2000 Angstroms at a 10:1 Mg to Ag ratio by volume.

The spectral characteristic of the EL device prepared according to this example is shown in FIG. 5 which plots the EL spectral radiance output as a function of the emission wavelength. This EL device was driven by a constant current source of 20 mA/cm$^2$. The bias voltage at this current density was about 10 volts. The EL spectrum was recorded by a spectro-radiometer. The narrow peak centering at 692 nm with a half bandwidth of 28 nm is characteristic of the emission from the MgPc molecule. The integrated output in this spectral region between 660 nm and 780 nm is 1.0 watt/m$^2$/sr. This level of radiant power is useful in printing on color photographic paper.

Example 2

Figure 6:
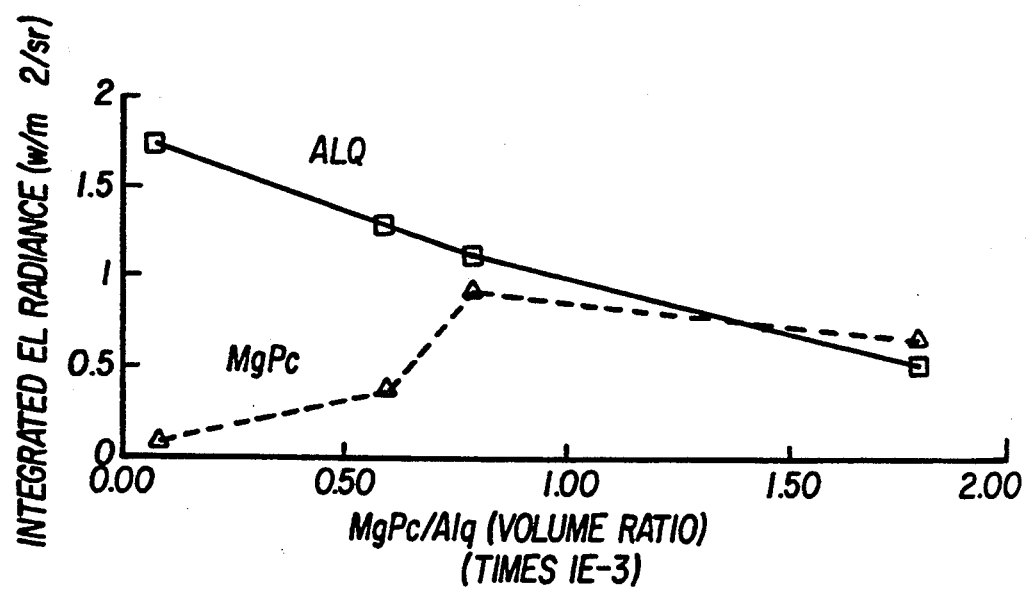
FIG. 6 is a graph showing the concentration dependence of MgPc in Alq on EL emission.

EL devices were prepared according to Example 1, except that the ratio of MgPc to Alq in layer 3 was varied. Without MgPc, the EL spectrum shows only the green emission band from the host Alq. The total output power of an undoped Alq cell driven at 20 m$^4$/Cm$^2$ is about 1.8 watt/m$^2$/sr. FIG. 6 illustrates the concentration dependence of the integrated EL outputs from the MgPc and Alq components. At a low concentration of MgPc, below 0.05%, the EL contribution is mostly from the host, Alq. At high concentrations, above 0.15%, both MgPc and Alq EL components decrease in output. The optimal concentration is about 0.1% in volume of MgPc in Alq. At this concentration, the EL from the MgPc component in the deep-red region is 1.0 watt/m$^2$/sr, which is about 50% of the total radiant power of the undoped Alq device emitting in the green.

Table 1 summarizes the EL spectral characteristics of some of these phthalocyanines used in an EL device as described in Example 1.

TABLE 1

| | EL Output and Spectral Characteristics | | | |
|---|---|---|---|---|
| Compound* | Vol. % (in Alg) | Peak Wl (nm) | FWHM (nm) | EL Power (w/m$^2$/sr) |
| MgPc | 0.08 | 692 | 28 | 0.96 |
| H2Pc | 0.08 | 704 | 24 | 0.66 |
| AlPcCl | 0.09 | 708 | 28 | 0.33 |
| AlPcXl | 0.10 | 708 | 24 | 0.41 |
| MgPc-TB | 0.10 | 696 | 28 | 1.10 |

*Molecular structures of these phthalocyanines are shown in structure IV

Thus, there has been described an efficient electroluminescence device that emits in the 700 nm region in a multi-layer organic device using a phthalocyanine compound as the luminescent emitter. The deep red-emitting electroluminescent device of the invention is useful as an addressable light source for digital printing photographic color paper. The deep red-emitter of the invention, together with the blue and green organic EL emitters, forms the three primaries that match well with the corresponding peak sensitivities of color photographic paper. Further monolithic integration of these emitters into a high density array on a common support permits the fabrication of an inexpensive printhead.

While the invention has been set forth with respect to preferred embodiments, all embodiments are claimed which come within the spirit of the invention.

| PARTS LIST |
|---|
| 100 EL device |

-continued

PARTS LIST

| | |
|---|---|
| 102 | anode |
| 104 | cathode |
| 106 | luminescent medium |
| 108 | external power source |
| 110 | conductor |
| 112 | conductor |
| 114 | holes |
| 116 | electrons |
| 118 | edges |
| 200 | organic EL device |
| 201 | transparent insulative support |
| 203 | anode |
| 205 | layer of organic material |
| 207 | layer of organic material |
| 209 | cathode |
| 300 | organic EL device |
| 301 | anode |
| 305 | hole transporting layers |
| 307 | electron transporting layers |
| 309 | cathode |
| 400 | organic EL device |
| 401 | anode |
| 402 | glass support |
| 403 | cathode |
| 404 | hole-injecting layer |
| 405 | hole transport layer |
| 406 | doped luminescent layer |
| 407 | electron transport layer |

What is claimed is;

1. An organic electroluminescent device comprising in sequence an anode, an organic hole injecting and transporting zone, a doped luminescent zone, an electron transport zone and a cathode, characterized in that said doped luminescent zone is comprised of a fluorescent phthalocyanine compound capable of emitting a wavelength in the range of 660 to 780 nm wherein the phthalocyanine compound constitutes 0.01 to 3 vol. % of the doped luminescent zone.

2. The organic electroluminescent device in accordance with claim 1 wherein said phthalocyanine compound has the structure:

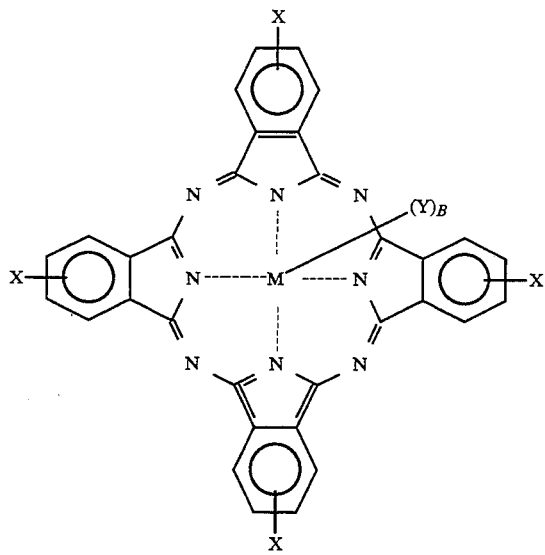

wherein
M is selected from 2H and a metal,
X is selected from hydrogen, halogen and a steric group, and $(Y)B$ wherein B is 0 or 1, and Y is one of the group consisting of a halogen, alkoxyl and phenoxyl containing compound when B is 1.

3. The organic electroluminescent device in accordance with claim 2 wherein M is a metal selected from the group consisting of Mg, Li, Na, Ca, Zn, Al, Ga and In.

4. The organic electroluminescent device in accordance with claim 1 wherein the steric group is selected from methyl, ethyl, pentyl, t-butyl, t-amyl and methoxy group.

5. The organic electroluminescent device in accordance with claim 2 wherein the halogen is selected from Cl, F and Br.

6. The organic electroluminescent device in accordance with claim 1 wherein the phthalocyanine compound is a metal-free phthalocyanine compound.

7. The organic electroluminescent device in accordance with claim 1 wherein the electroluminescent device has an emission wavelength beyond the visible range.

8. The organic electroluminescent device in accordance with claim 1 wherein the phthalocyanine compound constitutes 0.05 to 1 vol. % of the doped luminescent zone.

9. The organic electroluminescent device in accordance with claim 1 wherein the doped luminescent zone is comprised of a phthalocyanine compound and a host material comprised of metalized oxines.

10. The organic electroluminescent device in accordance with claim 1 wherein the doped luminescent zone is comprised of a phthalocyanine compound and a host material comprised of Tris(8-quinolinol)aluminum.

11. A red-emitting organic electroluminescent device comprising in sequence an anode, an organic hole injecting and transporting zone, a doped luminescent zone, an electron transport zone and a cathode, characterized in that said doped luminescent zone is comprised of a fluorescent phthalocyanine compound and wherein the phthalocyanine compound constitutes 0.01 to 3 vol. % of the doped luminescent Zone and having the structure:

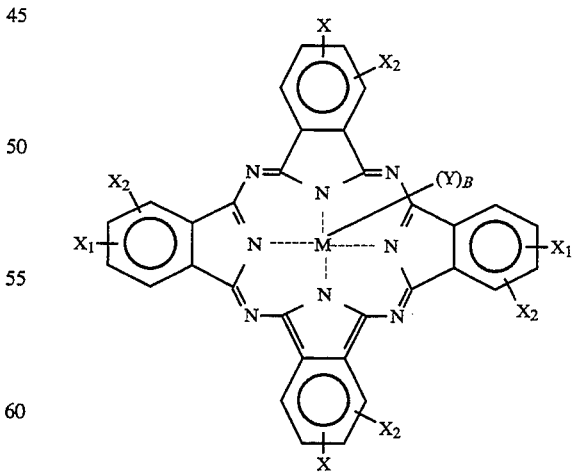

wherein:
M is selected from 2H and a metal,
$X_1$ or $X_2$ is one of the group selected from hydrogen, halogen, $C_nH_{2n+1}$ where n is 0 to 20, and cyano groups, and (Y)$_B$ wherein B is 0 or 1, and Y is selected from the group consisting of halogen, alkoxyl and phenoxyl containing compounds when B is 1.

12. A red-emitting organic electroluminescent device comprising in sequence an anode, an organic hole injecting and transporting zone, a doped luminescent zone, an electron transport zone and a cathode, characterized in that said doped luminescent zone is comprised of a fluorescent phthalocyanine compound and wherein the phthalocyanine compound constitutes 0.01 to 3 vol. % of the doped luminescent gone and having the structure:

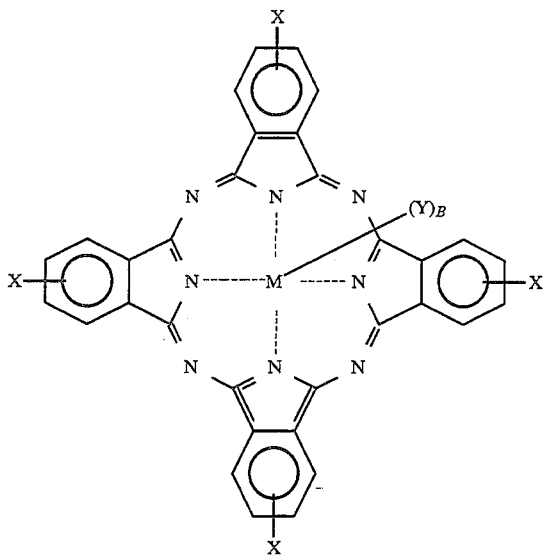

wherein:
M is selected from the group consisting of Mg, Li, Na, Ca, Zn, Al, Ga and In,
X is selected from H,
(Y)$_B$ wherein B is 0 or 1, and Y is selected from the group consisting of Cl and F when B is 1.

* * * * *